(12) United States Patent
Gao et al.

(10) Patent No.: US 10,324,794 B2
(45) Date of Patent: Jun. 18, 2019

(54) METHOD FOR STORAGE MANAGEMENT AND STORAGE DEVICE

(71) Applicant: EMC IP Holding Company LLC, Hopkinton, MA (US)

(72) Inventors: Hongpo Gao, Beijing (CN); Jian Gao, Beijing (CN); Jibing Dong, Beijing (CN); Geng Han, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 15/461,532

(22) Filed: Mar. 17, 2017

(65) Prior Publication Data
US 2017/0270000 A1    Sep. 21, 2017

(30) Foreign Application Priority Data
Mar. 17, 2016    (CN) .......................... 2016 1 0154088

(51) Int. Cl.
*G06F 11/00*    (2006.01)
*G06F 11/10*    (2006.01)
*G06F 11/14*    (2006.01)
*G06F 11/07*    (2006.01)
*G06F 3/06*    (2006.01)

(52) U.S. Cl.
CPC ........ *G06F 11/1088* (2013.01); *G06F 3/0604* (2013.01); *G06F 3/064* (2013.01); *G06F 3/0616* (2013.01); *G06F 3/0644* (2013.01); *G06F 3/0685* (2013.01); *G06F 3/0689* (2013.01); *G06F 11/0727* (2013.01); *G06F 11/1458* (2013.01); *G06F 11/1469* (2013.01)

(58) Field of Classification Search
CPC ............ G06F 11/1469; G06F 11/0727; G06F 11/1458; G06F 11/2094
See application file for complete search history.

(56) References Cited

U.S. PATENT DOCUMENTS

| | | | | |
|---|---|---|---|---|
| 7,421,509 B2 * | 9/2008 | Lolayekar | ........... | H04L 67/1097 370/231 |
| 7,634,627 B1 * | 12/2009 | Ohr | ..................... | G06F 11/1451 707/999.202 |
| 8,712,968 B1 * | 4/2014 | Chester | ............... | G06F 11/1417 707/649 |
| 2007/0288712 A1 * | 12/2007 | Zimoto | ................... | G06F 3/061 711/162 |

(Continued)

*Primary Examiner* — Charles Ehne
(74) *Attorney, Agent, or Firm* — Brian J. Colandreo; Heath M. Sargeant; Holland & Knight LLP (57) ABSTRACT

Embodiments of the present disclosure provide a method for storage management and a storage device. The method for storage management comprises; dividing a first storage medium into a first group or extents and a second group of extents, each extent including a plurality of logically continuous blocks of the first storage medium, the second group being reserved as backup extents; detecting whether an extent in the first group of extents is a defective extent; and disabling the extent in the first group of extents and mapping a logical address of the extent in the first group of extents to an extent in the second group of extents, in response to detecting that the extent in the first group of extents is a defective extent. With the embodiments of the present disclosure, a service life of storage device may be prolonged.

13 Claims, 5 Drawing Sheets

(56) References Cited

U.S. PATENT DOCUMENTS

| | | | |
|---|---|---|---|
| 2012/0084600 A1* | 4/2012 | Kidney | G06F 11/1088 714/6.13 |
| 2013/0311708 A1* | 11/2013 | Lee | G06F 21/79 711/103 |
| 2013/0346794 A1* | 12/2013 | Bartlett | G06F 11/2094 714/6.21 |
| 2014/0258595 A1* | 9/2014 | Venkatesha | G06F 9/5016 711/103 |
| 2014/0281215 A1* | 9/2014 | Chen | G06F 17/30 711/112 |
| 2017/0075781 A1* | 3/2017 | Bennett, Jr. | G06F 3/0619 |

* cited by examiner

METHOD FOR STORAGE MANAGEMENT AND STORAGE DEVICE

RELATED APPLICATIONS

This application claim priority from Chinese Patent Application Number CN201610154088.1, filed on Mar. 17, 2016 at the State Intellectual Property Office, China, titled "STORAGE MANAGEMENT METHOD AND STORAGE DEVICE," the contents of which is herein incorporated by reference in its entirety.

FIELD

Embodiments of the present disclosure generally relate to electronic technologies, and more specifically, to a method for storage management and a storage device.

BACKGROUND

A hard disk is a main storage medium of a computer. The hard disks may be divided into solid-state drives (SSDs), hard disk drives (HDDs), hybrid hard drives (HHDs), etc. A manufactured hard disk may generally have a plurality of bad areas. These areas are referred to as "primary defective areas." For example, the HDD may have a plurality of primary defective sectors. A HDD manufacturer makes tests to map these primary defective sectors to backup sectors by using firmware. The backup sectors are invisible outside the HDD. Therefore, when an external input output (I/O) instruction is addressed to a defective sector, the HDD actually maps the instruction to the backup sector. Additionally, bad sectors will also be generated during use of the HDD. This kind of bad sectors are referred to as "grown defective sectors." The "grown defective sectors" may be mapped to these backup sectors by using HDD firmware. When the backup sectors are used up, the HDD needs to be replaced. Similar occasions also exist in other types of storage mediums.

SUMMARY

Generally, embodiments of the present disclosure provide a method for storage management and a storage device managed by using the method.

According to a first aspect, there is provided a method for storage management, comprising: dividing a first storage medium into a first group of extents and a second group of extents, each extent including a plurality of logically continuous blocks of the first storage medium, the second group being reserved as backup extents; detecting whether an extent in the first group of extents is a defective extent; and disabling the extent in the first group of extents and mapping a logical address of the extent in the first group of extents to an extent in the second group of extents, in response to detecting that the extent in the first group of extents is a defective extent.

In some embodiments, the method further comprises reconstructing, in the second group of extents, data of the extent in the first group of extent in response to detecting that the extent in the first group of extents is a defective extent.

In some embodiments, the reconstructing data of the extent in the first group of extents include: reconstructing the data of the extent in the first group of extents by using data stored in a second storage medium, the first storage medium and the second storage medium constituting a redundant array of independent disks.

In some embodiments, the detecting whether an extent in the first group of extents is a defective extent comprises: determining the number of errors in the extent in the first group of extents; and determining that the extent in the first group of extents is a defective continuous extent in response to the number of errors exceeding a first threshold number.

In some embodiments, the detecting whether an extent in the first group of extents is a defective extent comprises: determining an error ratio an the extent in the first group of extents; and determining that the extent in the first group of extents is a defective continuous extent in response to the error ratio exceeding a first threshold ratio.

In some embodiments, a capacity of at least one extent in the first group of extents and the second group of extents is configurable.

In some embodiments, extents in the first group of extents and extents in the second group of extents have a same capacity.

According to another aspect, there is provided a storage device, comprising: a first storage medium and a processing unit, the processing unit being configured to divide a first storage medium into a first group of extents and a second group of extents, each extent including a plurality of logically continuous blocks of the first storage medium, the second group being reserved as backup extents, to detect whether an extent in the first group of extents is a defective extent, and to disable the extent in the first group of extents and map a logical address of the extent in the first group of extents to an extent in the second group of extents, in response to detecting that the extent in the first group of extents is a defective extent.

According to another aspect, there is provided a computer program product, the computer program product being tangibly stored on a non-transient computer readable medium and including a machine-executable instruction which, when being executed, causes the machine to execute a step according to the method above.

It may be understood that this section is not intended to identify key or important features of the embodiments of the present disclosure, not intended to limit the scope of the present disclosure. Other features of the present disclosure will become easily understood through the depiction below.

BRIEF DESCRIPTION OF THE DRAWINGS

The above and other advantages, features and objectives of the present disclosure will become more apparent through more detailed description of some embodiments of the present disclosure with reference to the accompanying drawings, in which.

In all of the accompanying drawings, same or similar reference numerals represent same or similar elements.

DETAILED DESCRIPTION OF EMBODIMENTS

Principles of example embodiments disclosed herein will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "based on" is to be read as "based at least in part on." The term "one embodiment" may be read as "at least one embodiment." The term "another embodiment" may be read as "at least one other embodiment." Herein, a hidden backup area refers to a backup storage area set by a storage device manufacturer. The hidden backup area is managed by a firmware of a storage device and is invisible external to the storage device. Herein, an available storage area refers to the storage area that may be used by the user other than the hidden backup area.

Figure 1:
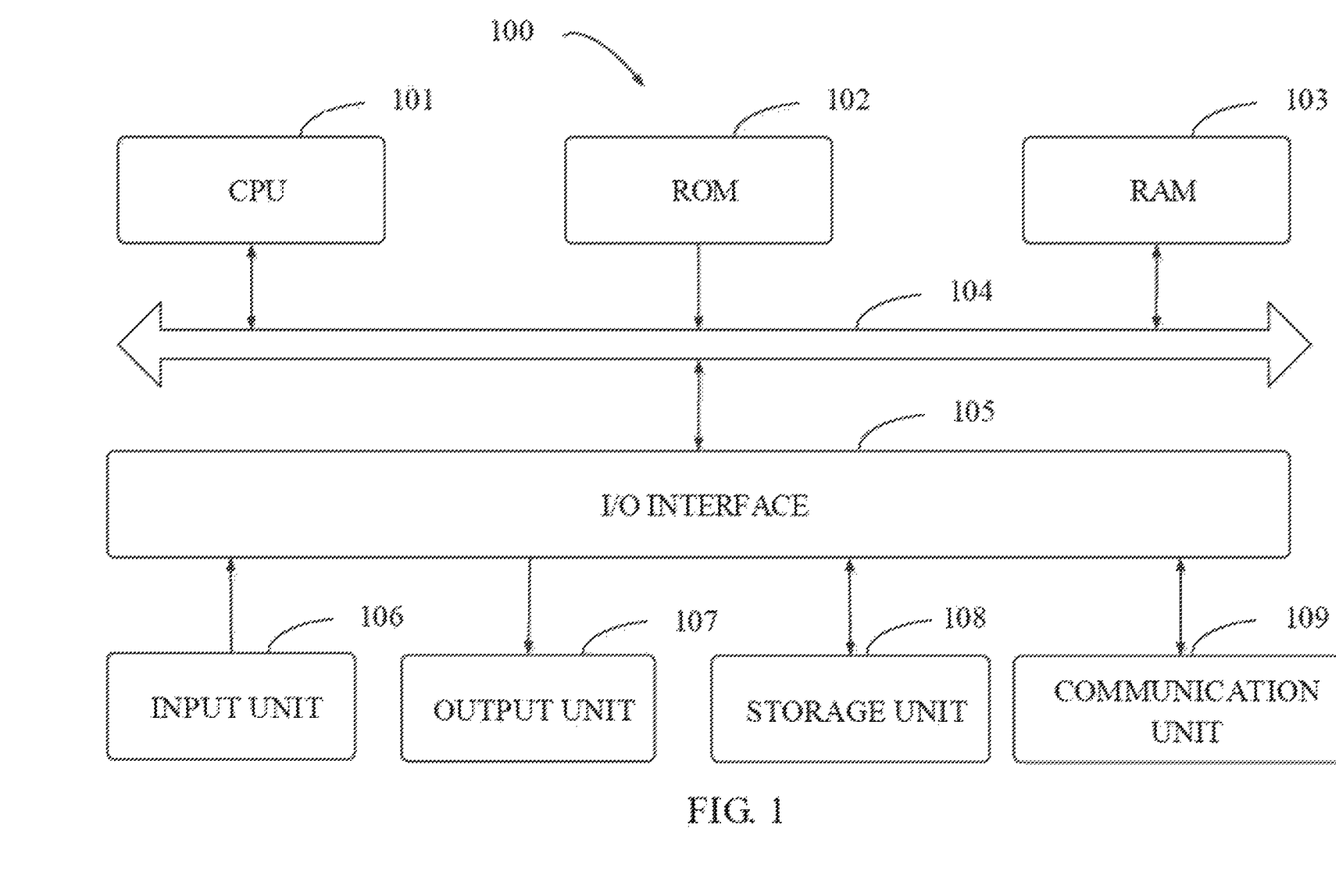
FIG. 1 is a simplified block diagram of art electronic device in which embodiments of the present disclosure may be implemented.

FIG. 1 is a simplified block diagram of an electronic device in which embodiments of the present disclosure may be implemented. As illustrated in the figure, the device 100 comprises a central processing unit (CPU) 101. The CPU 101 executes various kinds of appropriate actions and processes according to computer program instructions stored in a read-only memory (ROM) 102 or computer program instructions loaded from a storage unit 108 into a random access memory (RAM) 103. The RAM 103 may also store various kinds of programs and data needed for operations of the device 100. The CPU 101, the ROM 102, and the RAM 103 are connected with each other via a bus 104. An input/output (I/O) interface 105 is also connected to the bus 104.

A plurality of components in the device 100 are connected to the I/O interface 105, the components include: an input unit 106 such as a keyboard, a mouse, etc.; an output unit 107 such as various kinds of displays, a loudspeaker, etc.; a storage unit 108 such as a magnetic disk, an optical disk, etc.; and a communication unit 109 such as a network card, a modem, a radio transceiver, etc. The communication unit 109 allows the device 100 to exchange information/data with other device through a computer network such as Internet and/or various kinds of telecommunications networks.

The storage unit 108 may be the SSD, the HDD, or the HHD as mentioned above or any currently known or future developed other type of non-volatile storage medium. In an example that the device 100 is a data storage server, the storage unit 108 may be a redundant array of independent disks (RAID) consisting of a plurality of HDDs. The RAID combines a plurality of independent physical hard disks into a hard disk group (logical hard disk) according to different manners, thereby providing a storage performance higher than a single hard disk and providing a data backup technology. The different manners of organizing a disk array are referred to as RAID levels. From the perspective of a user, the formed group of disks are like a single hard disk, and the user may perform partitioning, formatting, and the like thereon. Generally, operations of the disk array are the same as those of the single hard disk, except that a storage speed of the disk array is far higher than the single hard disk, and an automatic data backup may be provided. For example, when a disk is damaged, a new disk may be used to replace the damaged disk; moreover, data on the damaged disk are reconstructed based on data on other disks in the RAID, thereby guaranteeing security of user data.

As mentioned above, in a storage device such as HDD, when a backup storage area such as a backup sector is used up, the storage device needs to be replaced. In practice, the replaced device still has a considerable amount of good storage areas. This will cause a larger waste of the storage device and a shorter service life of the storage device.

Some embodiments of the present disclosure provide an extent-based management method for storage device and a storage device managed by using the method so as to address the issues of waste and shorter service life. Herein, the term "extent" refers to a continuous logical block corresponding to a plurality of physical storage areas on the hard disk. Generally, some embodiments of the present disclosure divide available storage areas in the storage device into a first group of extents and a second group of backup extents. When an extent in the first group fails, the defective extent in the first group is mapped to the backup extent in the second group. In this way, the service life of the storage device may be prolonged, and the waste of the storage device may be avoided. At the ease of discussion, some embodiments may be described with reference to the HDD. However, it should be understood that this is only for illustrating the principle of the present disclosure, which is also suitable for storage devices of other types.

Figure 2:
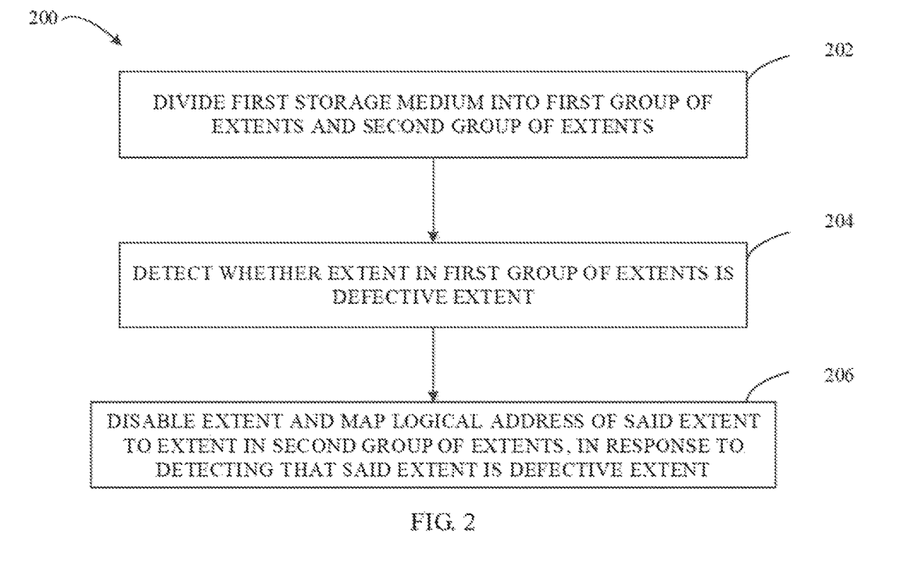
FIG. 2 illustrates a method for storage management according to embodiments of the present disclosure.

FIG. 2 shows a flow diagram of a storage management method 200 according to an embodiment of the present disclosure. In some embodiments, the method 200 may be implemented for example by the CPU 101 in FIG. 1 by executing machine-executable instructions. As an example, the processing unit may be implemented by the CPU 101 by executing machine-executable instructions. In other words, in some embodiments, the processing unit may be implemented through software. Alternatively, the processing unit may also be implemented through other manner, e.g., by hardware, including, but not limited to: an integrated circuit (IC) chip, an application-specific integrated circuit (ASIC) chip, or a system on chip (SoC).

In step 302, the processing unit divides the HDD (hereinafter referred to as "first HDD") into a first group of extents and a second group of extents. Each extent includes a plurality of logically continuous blocks of the first HDD, wherein the second group is reserved as backup extents. It may be understood that the backup extent here is different from the backup sector above. For example, the second group of extents may be implemented by a part of areas, in sectors, which are temporarily hidden. To the external, the HDD only has a size of the first group of extents, and only the first group of extents is available to the user.

With use of HDD, bad areas may gradually occur in the first group of extents. In step 304, the processing unit may detect whether the extent in the first group is a defective extent. As an example, the processing unit may record errors for each extent in the first group. For example, when the number or ratio of errors for an extent reaches a given threshold, the extent is determined to be a defective extent.

In step 306, in response to determining that the first group of extents always has a defective extent, the processing unit disables the extent. Moreover, the logical address of the defective extent is mapped to one or more extents in the second group of extents. In this way, an I/O operation from the external device is still addressed to the extent. However, the processing unit guides the I/O operation to a certain extent in the second group by mapping.

Figure 3:
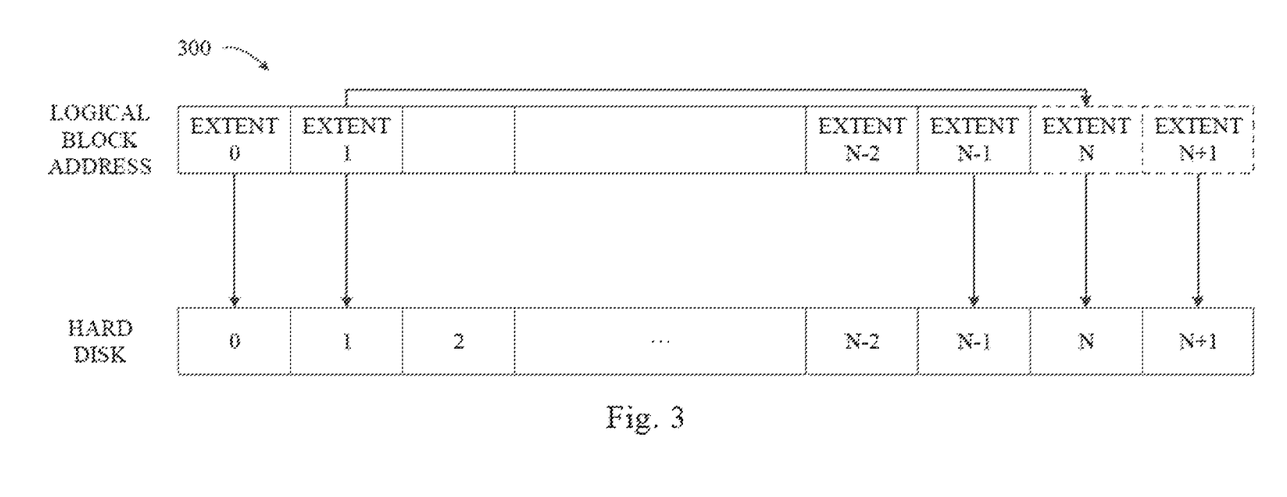
FIG. 3 is a schematic diagram of mapping according to embodiments of the present disclosure.

FIG. 3 illustrates a schematic diagram of a mapping 300 according to an embodiment of the present disclosure. For example, when one HDD is put into use, the processing unit logically generates a plurality of continuous extents each corresponding to a sector of the HDD. As an example, FIG. 3 illustrates dividing the HDD into N+M logical extents each corresponding to a respective sector area on the HDD, wherein N and M are natural numbers. According to an embodiment of the present disclosure, the logical extents are divided into N available logical extents (first group of extents) and M backup logical extents (second group of extents). The number of M may be determined based on needs or user input. In the example shown in FIG. 3, only as an example, the value of M is 2. In FIG. 3, the first group of extents are illustrated in solid lines, while the second group of extents are illustrated in dotted lines. The second group of extents are only visible to and managed by the processing unit.

During use, when the processing unit determines that a certain extent (e.g., extent 1) in the first group of extents is a defective extent, the extent will be disabled and mapped to one extent (e.g., extent N) in the second group of extents. Afterwards, the I/O operation of the external device is still addressed to extent 1, but the device manager actually guides the I/O operation to the extent N.

Figure 4:
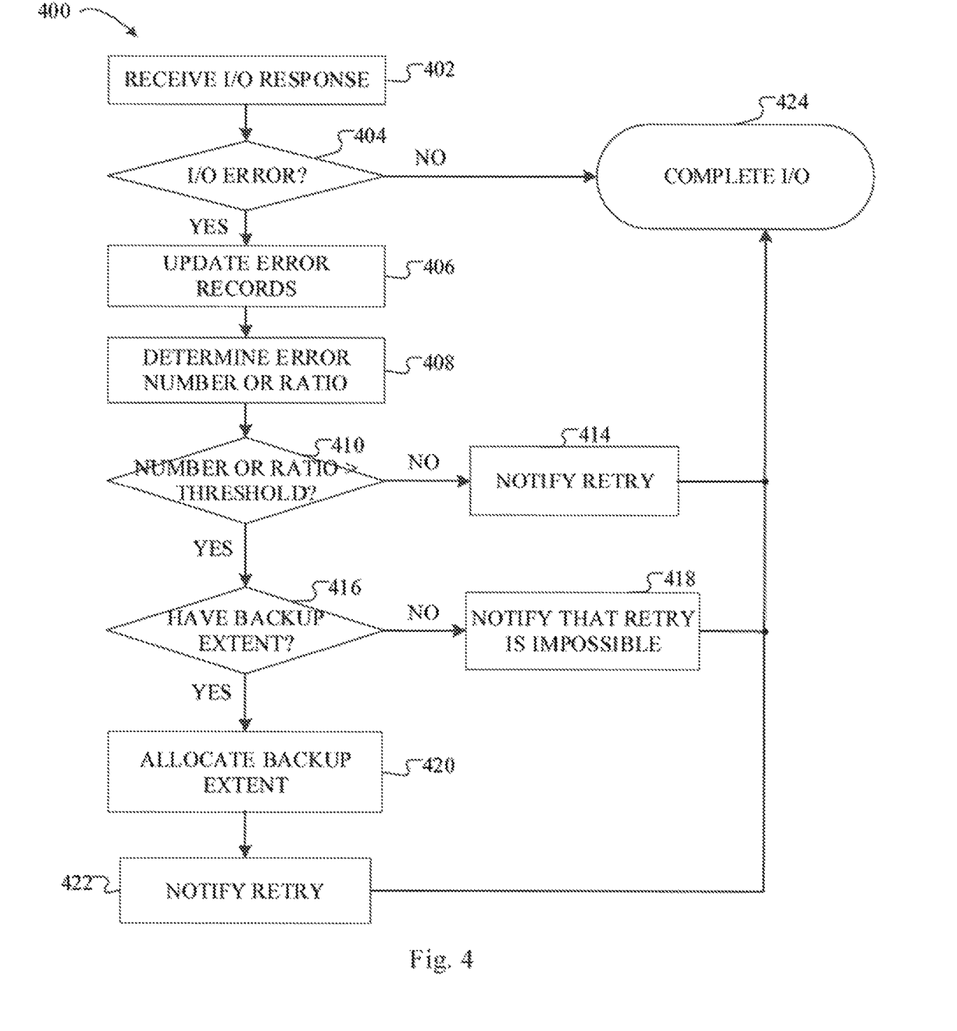
FIG. 4 is a flow chart of a method for storage management according to embodiments of the present disclosure.

FIG. 4 illustrates a schematic flow chart of a method 400 according to an embodiment of the present disclosure. In some embodiments, the method 400 may be regarded as a specific exemplary implementation of the method 200. Similar to the method 200, the method 400 may be implemented for example by the CPU 101 in FIG. 1 by executing machine-executable instructions. As an example, the processing unit may be implemented by the CPU 101 by executing machine-executable instructions. It may be understood that the processing unit may also be implemented by other manners, e.g., by hardware.

In step 402, the processing unit 400 receives an I/O response from the HDD. The I/O response from the HDD may include various kinds of information, including, but not limited to: sense key, additional sensing code/additional sensing code qualifier (ASC/ASCQ). The sensing keywords usually include a recovered error, unprepared, medium error, hardware error, etc. According to the I/O response including various kinds of the information, the processing unit may determine conditions of the HDD, including whether an error occurs in a sector area corresponding to a certain extent and a type of the error.

In step S404, the processing unit determines whether an error exists in the I/O response. If error does not exist, the method 400 proceeds to step 424. In step 424, the processing unit indicates, for example, to the component such as CPU 101, that the I/O operation has been successfully completed. On the other hand, if it is determined in step 404 that the error exists, the method 400 proceeds to step 406. In step 406, the processing unit updates an error record. In order to determine the condition of the HDD, the processing unit may record the number of I/Os and errors and/or the error ratio, and updates the records after occurrence of each I/O and error.

The processing unit may then determine whether the error exists in each extent in the first group of extents. Specifically, in step 408, the processing unit determines the number or ratio of errors. At the ease of discussion, suppose the processing unit determines that the number of errors of the extent 1 in FIG. 3 is 15,000 while the error ratio is 30% (i.e. averagely 30 errors per 100 I/Os). In step 410, the processing unit determines whether the number of errors or the error ratio is greater than the predetermined threshold number or threshold ratio. The study shows that disk error sectors of the HDD generally have a strong area concentration, i.e., errors usually concentrate on a specific area of the disk. A long-term defective I/O will affect the service life of the magnetic disk. Therefore, an error threshold number and an error threshold ratio may be set such that the specific area is disabled when the error number or ratio exceeds the threshold, so as to prolong the service life of the HDD.

If the number of errors or error ratio is smaller than the threshold, the processing unit notifies an external device to re-perform the I/O operation in step 414 and completes this I/O operation in step 424. Returning to step 410, where it is determined that the error number or error ratio is greater than the threshold, and then the method 400 proceeds to step 416 where the processing unit determines whether there still has a backup extent. In step 416, if there is no backup extent, the processing unit transmits information of being unable to retry I/O. This indicates that the backup extent on the HDD has been used up. Further the I/O operation possibly cannot be executed, and HDD needs to be replaced.

Returning to step 416, where if the processing unit determines that there is still a backup extent, the method proceeds to step 420. The processing unit allocates the backup extent in step 420, e.g., the extent N in the second group of extents in FIG. 3. To this end, the processing unit may update an extent mapping table. As an example, the processing unit updates the mapping table to record that the extent 1 has been mapped to the extent N. In step 420, the processing unit may also reconstruct data of a primary extent (e.g., the extent 1). In one example, after receiving a reconstructing instruction, the RAID system may reconstruct the data on the extent 1 based on data stored on other storage medium (second storage medium), and store it to the extent N. The processing unit also disables the error extent in step 420. The method 400 then proceeds to step 422. The processing unit notifies the external device to re-try the I/O operation and completes the I/O operation in step 424.

Various procedures and processes described above, e.g., methods 200 and 400, may be executed by the CPU 101. For example, in some embodiments, the method 200 and/or 400 may be implemented as computer software program that is tangibly included in a machine readable medium, e.g., the storage unit 108. In some embodiments, part or all of the computer program may be loaded and/or installed on the device 100 via the ROM 102 and/or the communication unit 109. When the computer program is loaded to the RAM 103 and executed by the CPU 101, one or more steps of the method 200 and/or 400 described above may be executed.

Figure 5:
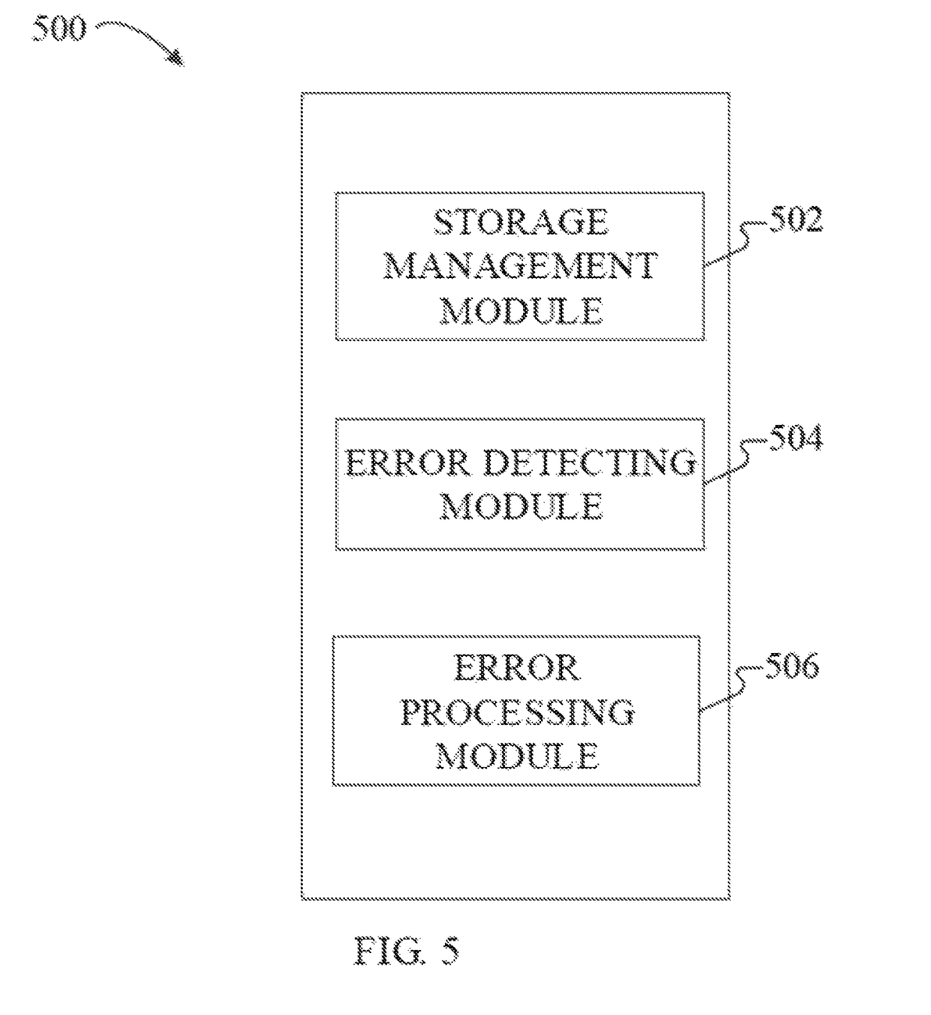
FIG. 5 is a block diagram of a storage manager according to embodiments of the present disclosure.

FIG. 5 is a schematic block diagram of a storage manager 500. Generally, the storage manager 500 may comprise modules configured to implement the functions and the operations shown in FIGS. 2-3. In this example, the storage manager 500 comprises: a storage management module 502 configured to divide a first storage medium into a first group of extents and a second group of extents, each extent including a plurality of logically continuous blocks of the first storage medium, the second group being reserved as backup extents; an error detecting module 504 configured to detect whether an extent in the first group of extents is a defective extent, and an error processing module 506 configured to disable the extent in the first group of extents and map a logical address of the extent in the first group of extents to an extent in the second group of extents, in response to detecting that the extent in the first group of extents is a defective extent.

In some embodiments, the storage manager 500 may also comprise a reconstructing module (not shown in the figure). The reconstructing module is configured to reconstruct, in the second group of extents, data of the extent in the first group of extents in response to detecting that the extent in the first group of extents is a defective extent. In some embodiments, the reconstructing module is configured to reconstruct the data of the extent in the first group of extents by using data stored in a second storage medium, the first storage medium and the second storage medium constituting a redundant array of independent disks.

In some embodiments, the error detecting module 504 is configured to determine the number of errors in the extent in the first group of extents. The error detecting module 504 is further configured to determine that the extent in the first group of extents is a defective continuous extent in response to the number of errors exceeding a first threshold number. In some other embodiments, the error detecting module 504 is configured to determine an error ratio in the extent in the first group of extents. The error detecting module 504 is further configured to determine that the extent in the first group of extents is a defective continuous extent in response to the error ratio exceeding a first threshold ratio.

In some embodiments, a capacity of at least one extent in the first group of extents and the second group of extents is configurable. As an example, the capacity of the extent in the first group of extents and the second group of extents may be configured to 1 GB. It may be understood that in sonic other examples, the capacity of the extents in the first group of extents and the second group of extents may have other capacity. In some embodiments, the extents in the first group of extents and the second group of extents may have the same capacity. As an example, the capacity of the extents in both the first group of extents and the second group of extents may be configured to 1 GB. It may be understood that in some other examples, the extents in the first group of extents and the second group of extents may have different capacities. For example, the extents in the first group of extents have a 2 GB capacity, while the extents in the second group of extents have a 1 GB capacity. It may be understood that the capacity of extents in the embodiments of the present disclosure is not limited to the capacities above, and other appropriate capacities are also applicable.

In some embodiments, part or all of the modules in the storage manager 500 may be implemented by software. Alternatively, the modules in the storage manager 500 may also be implemented in other manners, e.g., by hardware, including, but not limited to: an integrated circuit (IC) chip, an application-specific integrated circuit, a system on chip (SoC).

Generally, various embodiments of the present disclosure may be implemented by hardware, specific circuit, software, logic or any combination thereof. Some aspects may be implemented by hardware, and some other aspects may be implemented by firmware or software that may be executed by a controller, a microprocessor, or other computing device. Although various aspects of the present disclosure will be shown and described as block diagrams, flow charts or some other graphical representations; however, it may be understood that the blocks, devices, systems, technologies or methods described herein may be implemented in a non-limiting manner by hardware, software, firmware, specific circuit or logic, general hardware or controller or other computing device or a combination of some thereof.

Additionally, although the operations are described in a specific sequence, it should not be understood that these operations are required to be executed in the shown sequence or sequentially, or that all shown operations are required to be executed to achieve a desired outcome. In some cases, the multi-task or parallel processing may be advantageous. Similarly, although details based on the preferred embodiments are included in the above discussion, these should not be construed as any limitation to the scope of the present disclosure, while description of features is only for specific embodiments. Some features described in some separate embodiments may also be executed in combination in a single embodiment. In turn, various features described in a single embodiment may also be separately implemented in a plurality of embodiments or implemented in any appropriate sub-combination.

Although the present disclosure is described by using specific structural features and/or method actions, it may be understood that the present disclosure defined in the appended claims is not necessarily limited to the specific features or actions. The specific features and actions are only disclosed as examples for implementing the claims.

We claim:

1. A method for storage management, comprising:
    dividing a first storage medium into a first group of extents and a second group of extents, each extent including a plurality of logically continuous blocks of the first storage medium, the second group being reserved as backup extents;
    detecting whether an extent in the first group of extents is a defective extent, wherein the detecting whether the extent in the first group of extents is a defective extent comprises:
        determining an error ratio in the extent in the first group of extents; and
        determining that the extent in the first group of extents is a defective continuous extent in response to the error ratio exceeding a first threshold ratio; and
    disabling the extent in the first group of extents and mapping a logical address of the extent in the first group of extents to an extent in the second group of extents, in response to detecting that the extent in the first group of extents is a defective extent.

2. The method according to claim 1, further comprising:
    reconstructing, in the second group of extents, data of the extent in the first group of extent in response to detecting that the extent in the first group of extents is a defective extent.

3. The method according to claim 2, wherein the reconstructing the data of the extent in the first group of extents comprises:
    reconstructing the data of the extent in the first group of extents by using data stored in a second storage medium, the first storage medium and the second storage medium being included in a redundant array of independent disks.

4. The method according to claim 1, wherein the detecting whether the extent in the first group of extents is a defective extent comprises:
    determining the number of errors in the extent in the first group of extents; and
    determining that the extent in the first group of extents is a defective continuous extent in response to the number of errors exceeding a first threshold number.

5. The method according to claim 1, wherein a capacity of at least one extent in the first group of extents and the second group of extents is configurable.

6. The method according to claim 1, wherein extents in the first group of extents and extents in the second group of extents have a same capacity.

7. A storage device, comprising:
a first storage medium and
a processing unit configured to:
 divide a first storage medium into a first group of extents and a second group of extents, each extent including a plurality of logically continuous blocks of the first storage medium, the second group being reserved as backup extents;
 detect whether an extent in the first group of extents is a defective extent, wherein detecting whether the extent in the first group of extents is a defective extent comprises:
  determining an error ratio in the extent in the first group of extents; and
  determining that the extent in the first group of extents is a defective continuous extent in response to the error ratio exceeding a first threshold ratio; and
 disable the extent in the first group of extents and map a logical address of the extent in the first group of extents to an extent in the second group of extents, in response to detecting the extent in the first group of extents is a defective extent.

8. The storage device according to claim 7, wherein the processing unit is further configured to:
reconstruct, in the second group of extents, data of the extent in the first group of extent in response to detecting that the extent in the first group of extents is a defective extent.

9. The storage device according to claim 8, wherein reconstructing the data of the extent in the first group of extents comprises:
reconstructing the data of the extent in the first group of extents by using data stored in a second storage medium, the first storage medium and the second storage medium constituting a redundant array of independent disks.

10. The storage device according to claim 7, wherein detecting whether the extent in the first group of extents is a defective extent comprises:
determining the number of errors in the extent in the first group of extents; and
determining that the extent in the first group of extents is a defective continuous extent in response to the number of errors exceeding a first threshold number.

11. The storage device according to claim 7, wherein a capacity of at least one extent in the first group of extents and the second group of extents is configurable.

12. The storage device according to claim 7, wherein extents in the first group of extents and extents in the second group of extents have a same capacity.

13. A computer program product for storage management, the computer program product comprising:
a non-transitory computer readable medium encoded with computer executable code, the code configured to enable the execution of:
 dividing a first storage medium into a first group of extents and a second group of extents, each extent including a plurality of logically continuous blocks of the first storage medium, the second group being reserved as backup extents;
 detecting whether an extent in the first group of extents is a defective extent wherein detecting whether the extent in the first group of extents is a defective extent comprises:
  determining an error ratio in the extent in the first group of extents; and
  determining that the extent in the first group of extents is a defective continuous extent in response to the error ratio exceeding a first threshold ratio; and
 disabling the extent in the first group of extents and mapping a logical address of the extent in the first group of extents to an extent in the second group of extents, in response to detecting that the extent in the first group of extents is a defective extent.

* * * * *